(12) United States Patent
Jang (10) Patent No.: US 9,333,689 B2
(45) Date of Patent: May 10, 2016

(54) ROBOT FOR PROCESSING INJECTION MOLDED PRODUCT

(71) Applicant: HANYANG ROBOTICS CO.,LTD, Incheon (KR)

(72) Inventor: Eung-ha Jang, Seongnam (KR)

(73) Assignee: HANYANG ROBOTICS CO., LTD., Incheon (KR)

( * ) Notice: Subject to any disclaimer, the term of this patent is extended or adjusted under 35 U.S.C. 154(b) by 0 days.

(21) Appl. No.: 14/395,856

(22) PCT Filed: Jun. 16, 2014

(86) PCT No.: PCT/KR2014/005235
§ 371 (c)(1),
(2) Date: Jul. 24, 2015

(87) PCT Pub. No.: WO2015/064880
PCT Pub. Date: May 7, 2015

(65) Prior Publication Data
US 2015/0314507 A1    Nov. 5, 2015

(30) Foreign Application Priority Data

Oct. 30, 2013  (KR) .......................... 10-2013-0129733
Jun. 13, 2014  (KR) .......................... 10-2014-0072468

(51) Int. Cl.
*B29C 45/40*        (2006.01)
*B29C 45/42*        (2006.01)
(Continued)

(52) U.S. Cl.
CPC ................. *B29C 45/42* (2013.01); *B29C 45/76* (2013.01); *B65G 47/914* (2013.01);
(Continued)

(58) Field of Classification Search
CPC .. B29C 47/92; B29C 45/4005; B29C 37/0017
USPC .................................. 425/140, 556, 438, 444
See application file for complete search history.

(56) References Cited

U.S. PATENT DOCUMENTS 7,625,198 B2 * 12/2009 Lipson ................ B29C 67/0055
                                                  425/169
2007/0187394 A1 * 8/2007 Taniguchi .............. B22D 17/30
                                                  219/639
2013/0089642 A1 * 4/2013 Lipson ................ B29C 67/0055
                                                  426/115

FOREIGN PATENT DOCUMENTS

JP       06-031667 A    2/1994
JP       07-178688 A    7/1995
(Continued)

*Primary Examiner* — Tim Heitbrink
(74) *Attorney, Agent, or Firm* — Patent Office of Dr. Chung Park (57) ABSTRACT

Provided is a take-out robot including a load cell in a rotating unit to allow an injection molded product to be attached to an adhesive unit, measure a weight of the injection molded product, and determine whether the injection molded product is desirable or faulty. A chucking device of measuring the weight may be installed to prevent a vertical load during the taking out and a force during the conveying from being applied to the load cell, and allow the force to be applied to the load cell only when reaching a weight measuring point. Further, a cut portion may be formed to have a stepped boundary surface in the load cell and thus, a stopper function may be performed against bending deflection of the load cell when a load is applied so that the load cell may be protected without an additional chucking device of measuring the weight.

12 Claims, 7 Drawing Sheets

(51) Int. Cl.
- *B29C 45/76* (2006.01)
- *G01G 19/52* (2006.01)
- *G01G 21/22* (2006.01)
- *G01G 23/10* (2006.01)
- *B65G 47/91* (2006.01)
- *B29C 47/92* (2006.01)
- *B29C 37/00* (2006.01)

(52) U.S. Cl.
CPC ............ *B65G 47/918* (2013.01); *G01G 19/52* (2013.01); *G01G 21/22* (2013.01); *G01G 23/10* (2013.01); *B29C 37/0017* (2013.01); *B29C 45/4005* (2013.01); *B29C 47/92* (2013.01); *B29C 2945/7613* (2013.01); *B29C 2945/7625* (2013.01); *B29C 2945/76317* (2013.01)

(56) References Cited

FOREIGN PATENT DOCUMENTS

| | | |
|---|---|---|
| JP | 2013-195197 A | 9/2013 |
| KR | 10-0175757 B1 | 11/1998 |
| KR | 20-2009-0012612 U | 12/2009 |

\* cited by examiner

ROBOT FOR PROCESSING INJECTION MOLDED PRODUCT

CROSS-REFERENCE TO PRIOR APPLICATIONS

This application is a national Stage Patent Application of PCT International Patent Application No. PCT/KR2014/005235, filed on Jun. 16, 2014 under 35 U.S.C. §371, which claims priority of Korean Patent Application Nos. 10-2013-0129733, filed on Oct. 30, 2013, and 10-2014-0072468, filed on Jun. 13, 2014 which are all hereby incorporated by reference in their entirety.

TECHNICAL FIELD

The present invention relates to a take-out robot that takes out an injection molded product from a mold and places the product on a conveying apparatus such as a conveyer, and more particularly, to a take-out robot having therein a function of measuring a weight of an injection molded product and determining whether the product is desirable or faulty.

BACKGROUND ART

Figure 1:
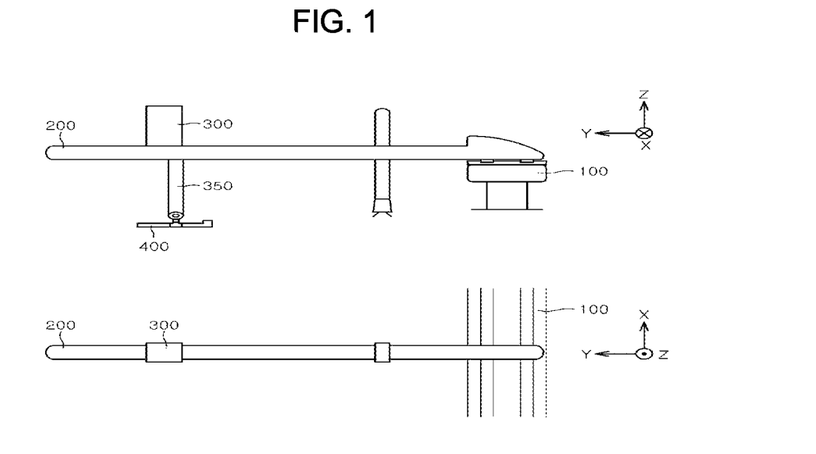
FIG. 1 is a front and a plane view illustrating a configuration and a motion of a general type take-out robot.

Various types injection molded products such as molds are produced in a wide range of industrial fields, and an operation of taking out the injection molded product is performed by a take-out robot. FIG. 1 is a diagram illustrating an example of a general type take-out robot. Such a take-out robot may perform X, Y, and Z motions. To allow the take-out robot to travel in an X direction, a moving line 100 is installed and a side-entry arm 200 that moves through a roller wheel on a guide rail is provided. The side-entry arm 200 may meet the moving line 100 at a right angle and has a predetermined length to allow a robot arm 350 to perform the Y motion. In addition, an ascent unit 300, vertical to both the moving line 100 and the side-entry arm 200, is installed onto the side-entry arm 200, and the robot arm 350 that is ascendable and descendible by a belt 1900, gear, or the like is mounted inside the ascent unit 300.

Figure 2:
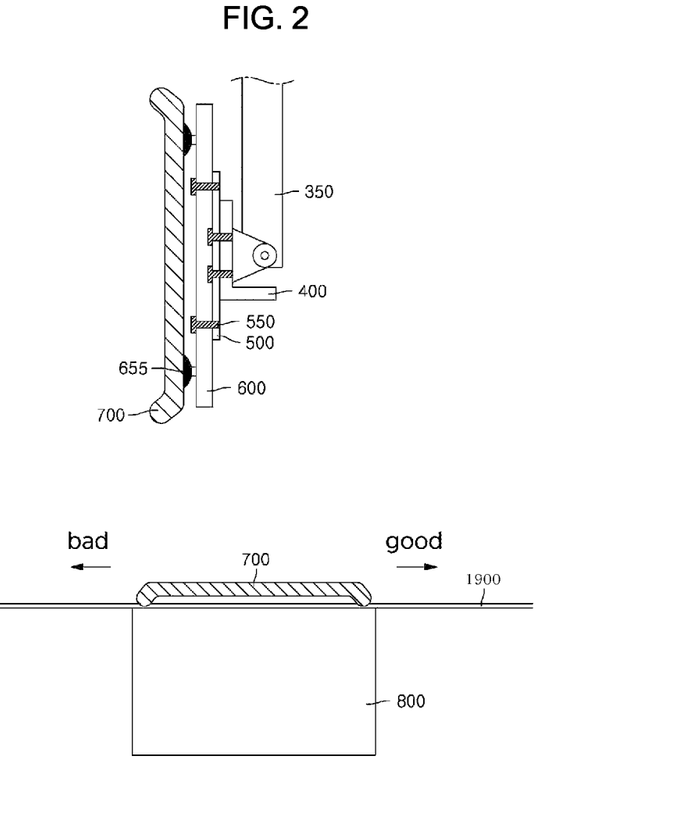
FIG. 2 is a schematic cross-sectional view illustrating a configuration of a rotating unit of a conventional take-out robot, and measuring a weight of an injection molded product conveyed by the take-out robot and a conveying route of a desirable and a faulty product based on the measurement of the weight.

FIG. 2 is a diagram illustrating a detailed configuration of the rotating unit 400 and other components used to perform the function of taking out an injection molded product.

The take-out robot includes the rotating unit 400 at an end of the robot arm 350 to take out an injection molded product 700 from an injection molder. In the rotating unit 400, a support 500 to readily attach and detach a jig 600 is mounted using a fixing element 550. The jig 600 having at least one adhesive element 650 may be fixed to the support 500 using the fixing element 550, for example, a bolt or the like. The rotating unit 400 is in a state of being vertically disposed, and the support 500 and the jig 600 are also vertically disposed in parallel to each other to approach the injection molded product 700.

The robot arm 350 travels along the moving line 100 (the X motion) to set a basic position to approach the injection molded product 700, sets a precise position by the Y motion, moves up and down (the Z motion) to adjust a height, allows the injection molded product 700 to be attached to the adhesive element 650 to lift up again (the Z motion), and places the injection molded product 700 down through the X and Y motion when reaching a destination, for example, a conveyer belt 1900. Here, the rotating unit 400 of the robot arm 350 ascended through the Z motion rotates at 90 degrees prior to the X and Y motions to horizontally convey the injection molded product 700 attached to the adhesive element 650.

Figure 3:
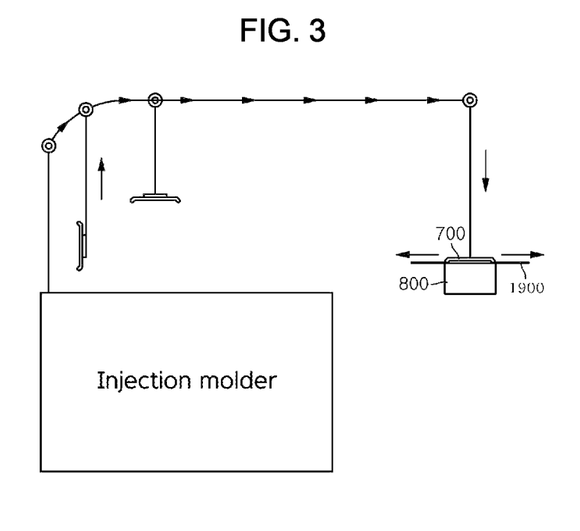
FIG. 3 is a schematic diagram illustrating the conveying route of an injection molded product of the conventional take-out robot, in terms of utilization of a space.

The horizontal conveyance of the injection molded product 700 is applied to enable a stable arrival of the injection molded product 700 on the conveyer belt 1900 and overcome a space limit. Due to the injection molder continuously operating, the injection molded product 700 to be conveyed by the take-out robot may be damaged by the injection molder. In addition, the injection molded product 700 may fall from the adhesive element 650 due to a turbulent vibration of the injection molder. Further, the injection molded product 700 may collide with a worker around the injection molder. In the case of the injection molded product 700 being vertically conveyed in a small space, a larger space may be required for the conveyance. Thus, the space may need to be reduced (see FIG. 3).

According to a conventional method, the injection molded product 700 conveyed by the robot arm 350 needs to pass through a large-sized expensive electronic scale to measure the weight of the injection molded product 700 prior to being placed on the conveyer belt 900 in order to determine whether the injection molded product 700 is desirable or faulty. The injection molded product 700 may be excessively or insufficiently molded and thus, become faulty, due to various factors such as an injection temperature, pressure, and time. Thus, a conveyer belt 1900 may be placed on a scale 800 and a direction to which a desirable product is conveyed is set. Simultaneously, an opposite direction is set as a direction to which a faulty product is conveyed. The faulty product is set to be put into a collection box. Accordingly, the conveying direction may be differently set based on a result of measuring the weight. To determine whether the injection molded product 700 is desirable or faulty based on the measured weight, a large space may be required for conveyance performed by the robot arm 350, installation of the conveyer belt 1900 used to convey the desirable product, an additional scale, and the determination. For example, Korean Patent Publication No. 10-2010-0065950 discloses a lamp faultiness detector provided on a conveyer belt.

In addition, the injection molded product 700 conveyed by the robot arm 350 may not be immediately conveyed to a destination, but pass through the determination subsequent to the measurement of the weight, and thus, time is greatly delayed. Moreover, a moving direction of the conveyer belt 900 needs to be differently controlled due to an amount of time used to reset the scale 800 and accordingly, there is a problem in that a conveying speed greatly decreases and productivity deteriorates.

DISCLOSURE OF THE INVENTION

Problem to be Solved by the Invention

An aspect of the present invention provides a take-out robot that determines whether an injection molded product is desirable or faulty by measuring a weight of the injection molded product without an additional scale installed in a separate space from the take-out robot, and after the determination, differently sets a conveying route for a desirable and a faulty product so that a required space and facility may be reduced and a speed of conveying the injection molded product may be greatly improved.

In addition, the take-out robot may be designed to realize a stable operation and have a prolonged service life of a weight measuring system installed therein.

Means for Solving Problem

According to an aspect of the present invention, there is provided a take-out robot including a load cell provided in a rotating unit of the take-out robot. The take-out robot with load cell may allow an injection molded product to be attached on an adhesive unit and to be determined whether the injection molded product is desirable or faulty by measuring a weight of the injection molded product on a conveying route by the load cell, and the conveying route to be differently set for a desirable and a faulty product.

Preferably, the load cell may be disposed on a back side of a jig mounted on the rotating unit. After the injection molded product is attached to the adhesive unit of the jig, the rotating unit may rotate and allow the jig and the injection molded product to be disposed horizontally. In a route through which the injection molded product is conveyed, the rotating unit may be stopped and the weight of the injection molded product may be measured by the load cell. When the injection molded product is determined to be desirable, the injection molded product may be conveyed to a destination. Conversely, when the injection molded product is determined to be faulty, the injection molded product may be conveyed to a collection box. In such a way, an operation and the route of the take-out robot may be controlled by a controller.

To prevent damage to the load cell provided in the rotating unit and prolong a service life of the load cell, the rotating unit may be stopped around a junction between conveying routes for the desirable and the faulty product so that the weight of the injection molded product may be applied to the load cell. In other sections of the conveying routes, the jig to which the injection molded product is attached may be entirely chucked so that the weight of the injection molded product may not be applied to the load cell.

Examples of a unit of chucking include a pneumatic cylinder, a solenoid, or a rotatable hand device (also referred to as a lever) by which the chucking may be performed not to apply a load of the injection molded product to the load cell, and, at a desirable point, the load of the injection molded product may be applied to the load cell.

According to the present invention, when measuring the weight of the injection molded product using the load cell provided in the take-out robot, the load cell may be connected to the rotating unit on which the load cell is mounted using a first fixing element. In addition, the load cell and the jig that is mounted on the load cell and that allows the injection molded product to be attached thereto to load may be connected using a second fixing element. A chucking unit, for example, the pneumatic cylinder or the solenoid may be disposed at a position at which the rotating unit and the back side of the jig are connected. Thus, when the injection molded product is attached to the adhesive unit of the jig, the rotating unit may rotate and the injection molded product may be positioned at bottom end. Here, the jig may be chucked to be in contact with the load cell through a chucking operation of the chucking unit. When the injection molded product reaches a weight measuring point and the chucking operation is cancelled, the load cell may be applied with a force downward due to the weight of the injection molded product and a weight of the jig. Here, each of the first and the second fixing elements may receive different tension. The difference in the tension may be applied to the load cell as a tensile force so that the load cell may measure the weight of the injection molded product. In this case, the tensile force by the jig without the injection molded product may be measured in advance to obtain a gauge and thus, whether the injection molded product is desirable or faulty may be determined by measuring the own weight of the injection molded product.

In addition, according to the present invention, provided is the take-out robot, in which the robot arm of the take-out robot may include the jig having at least one adhesive element that may be fixed to the rotating unit using a fixing element and attach the injection molded product thereto, and the load cell mounted between the rotating unit and the jig.

The rotating unit may be fixed to an end of the robot arm to be rotatable, and rotate to place the injection molded product in a horizontal position after the injection molded product is attached and to allow the load cell to measure the weight of the injection molded product.

The load cell may include at least one cut portion, and the cut portion may form a stepped boundary surface.

A step portion of the stepped boundary surface may form a gap in a direction perpendicular to gravity when the rotating unit is at a rotated position to measure the weight of the injection molded product. When the weight of the injection molded product is applied to the load cell, the gap may prevent bending deflection of the load cell.

In addition, according to the present invention, provided is the take-out robot, in which when the weight of the injection molded product is measured by the load cell, the injection molded product may be conveyed to a corresponding point and a weight measuring system may be reset to be "0" point by the load cell so that a cumulative error in measuring a weight of a subsequent injection molded product may be prevented.

In addition, according to the present invention, after the weight of the injection molded product is measured by the load cell, the junction at which the conveying routes for the desirable and the faulty products are differently set may be selected to be a point at which a conveyer for the desirable product and a collection box for the faulty product are disposed farthest from an injection molder.

Effects of the Invention

According to the above-described configuration of an embodiment of the present invention, there is no need to install an additional scale and a conveying route other than the take-out robot, and thus cost for installation is reduced and it is advantageous in terms of space utilization.

Further, the take-out robot may measure a weight of an injection molded product and determine whether the injection molded product is desirable or faulty to differently set a conveying route based on the determination. Therefore, in comparison to a conventional method of measuring a weight of an injection molded product by placing the product on a scale and then controlling an overall driving direction of a conveyer belt, the take-out robot disclosed herein may convey the injection molded product much faster and with a lower cost.

Further, according to an embodiment of the present invention, a weight of an injection molded product conveyed by the take-out robot may be measured at a junction adjacent to a final destination of a desirable product, in lieu of an initial point. The weight of the injection molded product may be applied to a load cell only when the injection molded product reaches the junction and thus, a service life of the load cell may be prolonged.

Further, a point at which the take-out robot measures the weight of the injection molded product may be set to be a point farthest from an injection molder and thus, an error interference of the load cell that is caused by vibration generating when the injection molder operates may be excluded.

Further, a gap in a cut portion formed in the load cell may be used to prolong the service life of the load cell because deformation of the load cell by a force applied to the load cell is buffered. Such a configuration may be applied for simpler implementation without other additional elements to prolong the service life of the load cell.

Furthermore, a cumulative error may be prevented by resetting a weight measurement system to be 0 point after the weight of the injection molded product is measured, one by one, by the load cell formed therein the cut portion and thus, the weight of the injection molded product may be more precisely measured.

EXPLANATIONS OF LETTERS OR NUMERALS

100: moving line
200: side-entry arm
300: ascent unit
350: robot arm
400: rotating unit
500: support
550: fixing element
600: jig
650: chucking element
655: adhesive element
670: weight measurement switch
680: piston
685: elastic body
700: injection molded product
800: scale
840: first fixing element
850, 900: load cell
860: second fixing element
870: hand device
910: stepped boundary surface
915: (gap) horizontal portion
917: (gap) vertical portion
919: strain gauge
920: gauge
1900: belt

BEST MODE FOR CARRYING OUT THE INVENTION

Preferred embodiments of the present invention will be described in detail with reference to the accompanying drawings.

The overall configuration of a take-out robot performing X, Y, and Z motions is illustrated in FIG. 1. The configuration and operations provided with reference to FIG. 1 are described hereinbefore and thus, a repeated description will be omitted hereinafter for brevity.

Figure 4:
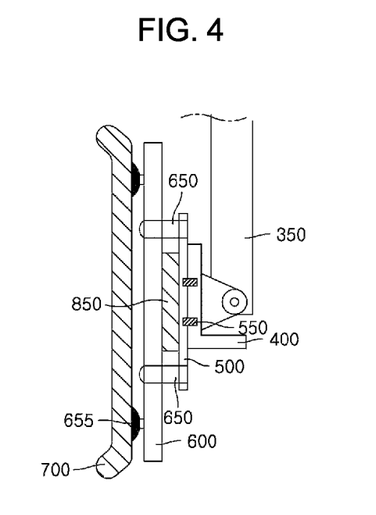
FIG. 4 is a cross-sectional view illustrating a configuration in which a load cell is provided in a rotating unit of a take-out robot according to the present invention.

A load cell 850 is installed in a rotating unit 400 of the take-out robot as illustrated in FIG. 4 to provide a function of sensing a weight. In the rotating unit 400 rotatably fixed to an end of a robot arm 350, a support 500 may be fixed using a fixing element 550, for example, a bolt, and the load cell 850 may be provided therein prior to installation of a jig 600. The load cell 850 may be fixed to the support 500 using various types of the fixing element 550, for example, a bolt. The support 500 may be added to facilitate attachment and detachment of the jig 600 and thus, may be omitted. When the support 500 is omitted, the load cell 850 may be provided in the rotating unit 400. The jig 600 may be provided on the load cell 850 and the jig 600 is fixed to the support 600 using the fixing element 550. Various types of adhesive elements 655 are fixed to the jig 600 so that an injection molded product 700 is directly chucked thereto. In addition, the adhesive elements 655 may be replaced with another form of a chucking element, for example, an adhesive or a magnet.

Figure 5:
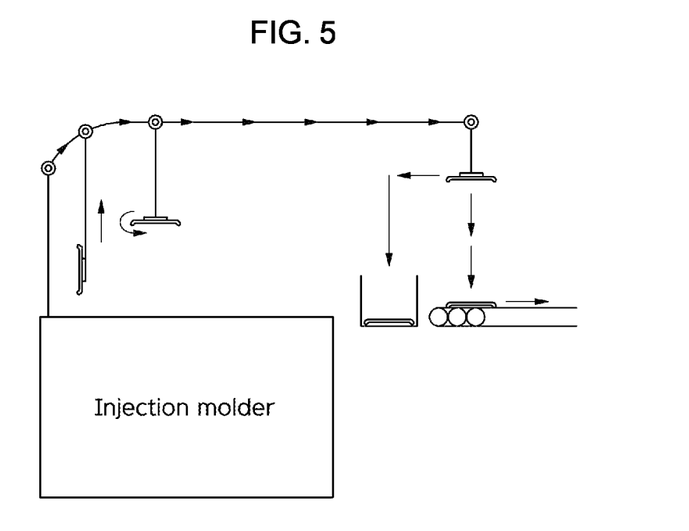
FIG. 5 is a schematic diagram illustrating a conveying route of an injection molded product, a weight measurement point, and utilization of a space of the take-out robot according to the present invention.

The rotating unit 400 of the robot arm 350 having such a configuration ascends from an injection molder and rotates at 90 degrees as illustrated in FIG. 5 to allow the injection molded product 700 to be horizontally positioned. The injection molded product 700 horizontally positioned applies a load to the load cell 850 along with the jig 600 so that a combined weight may be measured. A control module programmed to differently set each conveying route for a desirable and a faulty product after determining whether the injection molded product 700 is desirable or faulty in response to the result of measuring the weight of the load cell 850 is installed in a controller that controls an overall operation of the take-out robot. Thus, the robot arm 350 moves in accordance with the control module.

Referring to FIG. 5, the robot arm 350 of the take-out robot lifts an injection molded product 700 taken out from an injection molder by chucking the injection molded product 700 using the adhesive elements 655, horizontally rotates the injection molded product 700, proceeds with the injection molded product 700 in a predetermined section, arrives at a section far away from the injection molder, for example, above a conveyer belt 1900 used to carry the injection molded product 700, and places down a desirable product on the conveyer belt 1900 by setting the point as a junction or moves above a collecting box and drops a faulty product. To prevent vibration of the injection molder from affecting the measurement of the weight, a point at which the weight is to be measured, also referred to as a weight measuring point, and which is located farthest from the injection molder may be selected.

In comparison to a conventional configuration in which all injection molded products 700 are placed down on a scale 800 and respective conveying routes for a desirable and a faulty product are differently set based on the scale 800 using a conveyer belt operating unit including an additional control unit, such a configuration according to this embodiment of the present invention may not require the conveyer belt operating unit and thus, installation may be simplified. The weight is measured in the rotating unit 400 of the robot arm 350 of the take-out robot in advance, and a command for setting the conveying routes is provided in the control module of the controller for the take-out robot. Thus, an additional control apparatus may not be required. In addition, a space for the scale 800 is not required and thus, the space may be saved. In the conventional take-out robot, a driving direction of the conveyer belt 1900 may need to change based on a result of the measurement performed by the scale 800. Thus, it is possible to improve an issue of a large amount of energy consumption caused by driving power against inertia that is required every time when the faulty product is detected. In the take-out robot according to the embodiment of the present invention, the conveying route is determined in advance and thus, the conveyer belt 1900 conveying the desirable product may continuously operate in one direction until the desirable product arrives at a destination. Accordingly, the conveyance may be faster and a driving energy may be reduced.

The load cell 850 has a feature of consumables and is not permanently usable and thus, the load cell 850 may need to be replaced when a service life of the load cell 850 is expired. To maximize the service life of the load cell 850, the inventor devises a method to be described hereinafter.

An operation of the take-out robot of measuring the weight of the injection molded product 700 using the load cell 850 will be described in detail with reference to FIGS. 6 and 7.

The support 500 is fixed to the rotating unit 400 to be rotatably fixed to an end of the robot arm 350 using the fixing element 550, for example, a bolt, and the load cell 850 is fixed thereto prior to installation of the jig 600. The load cell 850 may be fixed to the support 500 using various types of the fixing element 550, for example, a bolt. When the support 500 is omitted, the load cell 850 is provided in the rotating unit 400. The jig 600 is mounted on the load cell 850, and the jig 600 and the support 600 are fixed together using the fixing element 550. Various types of the adhesive elements 655 may be fixed to the jig 600 so that the injection molded product 700 may be directly chucked thereto. Here, the adhesive elements 655 may be replaced with various types of a chucking element, for example, an adhesive or a magnet.

For example, when the support 500 to which the load cell 850, or the support 500 is fixed is omitted, the rotating unit 400 and the load cell 850 may be connected using a first fixing element 840 in a form of a pin having a stopper, whereas the jig 600 to be mounted on the load cell 850 and to chuck and load the injection molded product 700, and the load cell 850 may be connected using a second fixing element 860. It is desirable that respective positions of the first fixing element 840 and the second fixing element 860 be set at both ends of the load cell 850 respectively.

The robot arm 350 of the take-out robot having such a configuration may operate as follows.

When the injection molded product 700 is attached to an adhesive portion of the jig 600 and is chucked, the robot arm 350 ascends from the injection molder, rotates the rotating unit 400 at 90 degrees, and allows the injection molded product 700 to be parallel to a floor. The injection molded product 700 is conveyed to the conveyer belt 1900, and the weight of the injection molded product 700 is measured above the junction between the conveyer belt 1900 and the collection box.

To prevent damage during the conveyance by preventing a tensile force from being applied to the load cell 850 and to prolong the service life of the load cell 850, a chucking element 650 that may chuck the injection molded product 700 and the jig 600 is installed in the rotating unit 400 or the support 500. The chucking element 650 pulls the jig 600 and the injection molded product 700 toward the load cell 850, but a stress does not occur in the load cell 850 due to a balance with gravity. The chucking element 650 may be provided in a form of a solenoid, a pneumatic cylinder, or a rotatable hand device.

Figure 6:
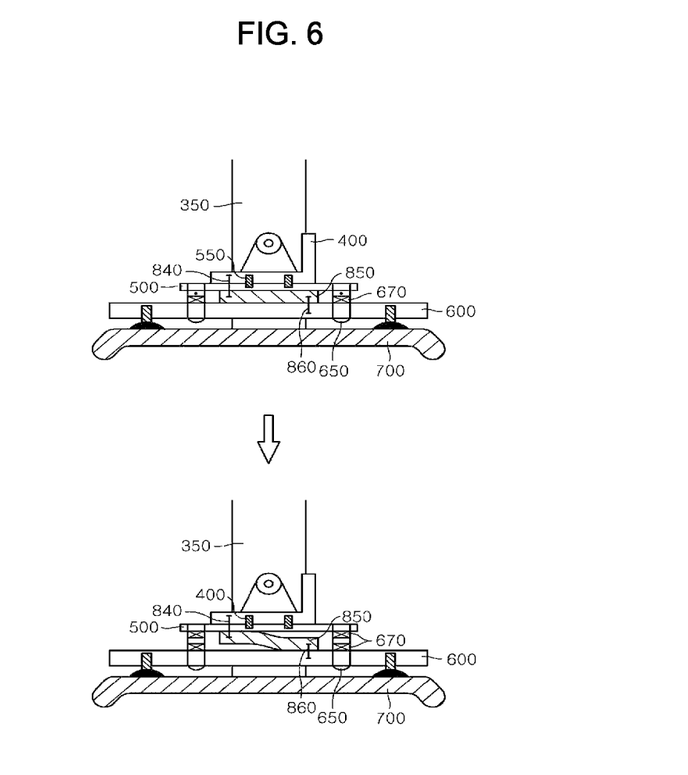
FIG. 6 is a cross-sectional view illustrating an embodiment in which the rotating unit including the load cell according to the present invention measures a weight of an injection molded product while a solenoid is applied as a chucking element.

FIG. 6 illustrates an example of the chucking element 650 formed as the solenoid. A pair of solenoids 670 facing each other is provided. A first solenoid is fixed to a back side of the jig 600, and a second solenoid facing the first solenoid is mounted on an upper side of the support 500. When current in opposite directions is applied to allow the first solenoid and the second solenoid to pull each other, the solenoids may pull the jig 600. To measure the weight, current in the same direction is applied to allow the first solenoid and the second solenoid to push each other, or the current may be cut to cancel a pulling force to cause dechucking.

Figure 7:
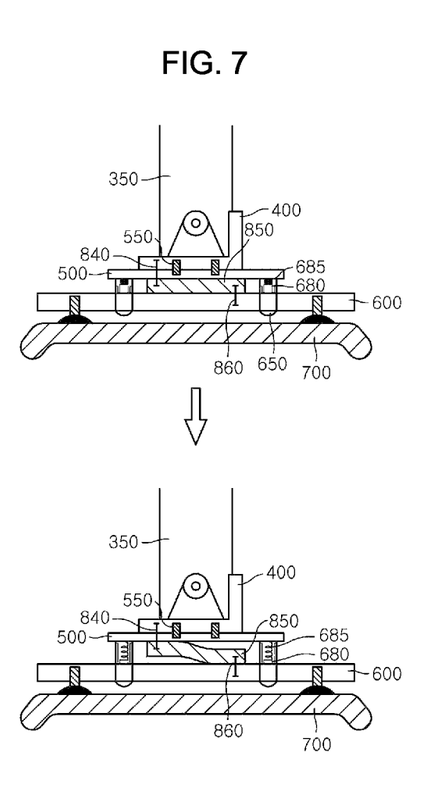
FIG. 7 is a cross-sectional view illustrating an embodiment in which the rotating unit including the load cell according to the present invention measures a weight of an injection molded product while a pneumatic cylinder is applied as a chucking element.

FIG. 7 illustrate an example of a chucking element 670 formed as the pneumatic cylinder.

An elastic body 685 is mounted on the rotating unit 400 or the support 500, and a piston 680 supporting the elastic body 685 is mounted on a back side of the jig 600 along with a liner. The piston 680 may be elevated and maintained the position by supplying gas, and the gas is absorbed at a point requiring the measurement of the weight to causing dechucking so that the jig 600 is placed down on the load cell 850 using the elasticity of the elastic body 685.

Figure 8:
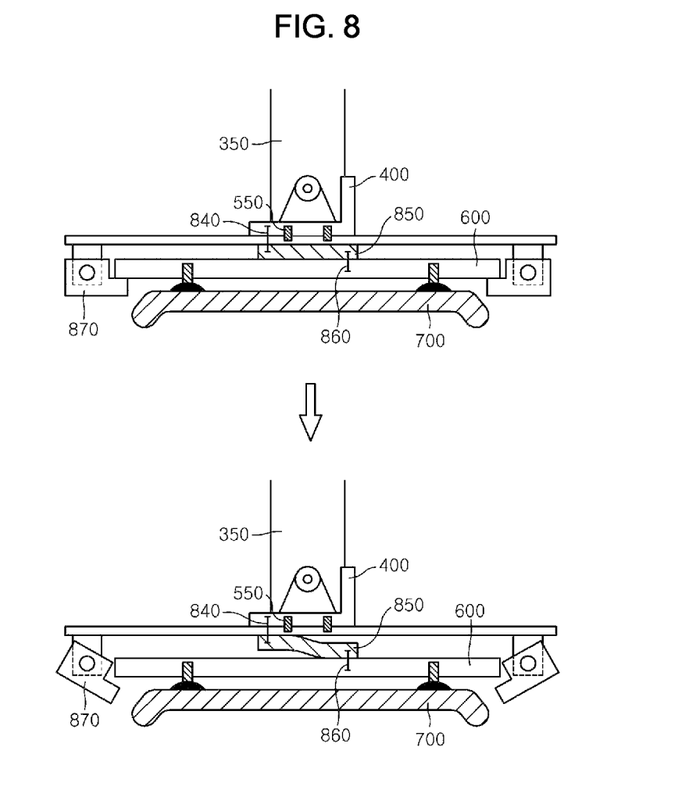
FIG. 8 is a cross-sectional view illustrating an embodiment in which the rotating unit including the load cell according to the present invention measures a weight of an injection molded product while a rotatable hand device is applied as a chucking element.

In addition, as illustrated in FIG. 8, a simple rotatable hand device 870 may be applied as the chucking element 670. The hand device 870 supporting the jig 600 may be rotatably driven by a motor or the like and thus, an angle of the hand device 870 may be inclined from a horizontal state to dechuck the jig 600.

That is, when reaching the weight measurement point, the chucking element 650 cancels a chucking operation.

The pneumatic cylinder discharges air to release the elastic body 685 from an air absorption state through which the elastic body 685 is compressed, and the pair of solenoids are cut off from current applied to allow a pulling force to influence the pair of solenoids or controls a direction of the current to allow a repulsive force to influence the pair of solenoids, and rotate a hand device to cancel a support function. Here, the load cell 850 is affected downward by a force caused by the weight of the injection molded product 700 and the jig 600, each of the first fixing element 840 and the second fixing element 860 receives a different tension, and the difference in the tension is applied as a tensile force to the load cell 850 and thus, the load cell 850 may measure the weight of the injection molded product 700. Here, the tensile force only by the jig 600 without the injection molded product 700 is measured in advance and reset in advance and thus, only the weight of the injection molded product 700 may be measured. In addition, whether the injection molded product 700 is desirable or faulty is determined by granting an error tolerance within a predetermined range. Such a method of measuring the weight based on the measurement of the tensile force is precise and stable because the method has less fluctuation and adaptable to gravity. A point at which the weight is actually measured is a point located far away from the injection molder as illustrated in FIG. 5 and also the junction at which a route of the robot arm 350 is divided based on locations of the conveyer belt 1900 and the collection box. At a point in time at which the take-out robot takes out the injection molded product 700 from the injection molder, the chucking operation of the chucking element 650 prevents a vertical load from being applied to the load cell 850 and a load of the injection molded product 700 from being applied. The weight may be measured by maintaining a stop state when the junction is reached and thus, damage to the load cell 850 may be prevented and the service life may be maximized.

As described in the foregoing, a method of measuring the weight after arriving at the junction may avoid vibration that is caused by injection performed by the injection molder and thus, a measurement error may be reduced, which is advantageous.

In the above-mentioned embodiment, it is possible to omit the support 500 and mount the load cell 850 in the rotating unit 400 and install the jig 600 on the load cell 850. Such a modification may be easily achieved by those skilled in the art based on the descriptions provided in the foregoing.

Hereinafter, another embodiment of the present invention will be described. Here, a configuration of the load cell 850 is modified as illustrated in FIG. 9.

A load cell 900 includes a stepped cut portion 910 that is bilaterally symmetrical. The stepped cut portion 910 forms a stepped boundary surface 910 in the load cell 900, and a configuration thereof is illustrated in detail in a partially enlarged diagram. When the jig 600 remains in a vertical direction, the injection molded product 700 may be taken out. Here, the load cell 900 is vertically arranged and thus, a step portion of the stepped cut portion 910 forms and maintains a vertical gap in the load cell 900. When the rotating unit 350 rotates to convey the injection molded product 700, the gap position also changes to a horizontal direction. To prevent damage to the load cell 900 during measurement of the load of the injection molded product 700, the stepped cut portion 910 is formed. When the load of the injection molded product 700 is applied to the load cell 900, the load cell 900 is modified and accordingly, a strain gauge 919 of the load cell 900 operates and allows an amount of current proportional to the load to flow in order to measure the load. When the load of the injection molded product 700 is applied to the load cell 900, both ends of the load cell 900 are affected downwards by a force and slightly sunk (see FIG. 11). Although the load cell 900 is contracted downwards due to the load, the gap is slightly narrowed and the load cell 900 may not be deformed or damaged. To solve an issue of measurement interference by twisting and/or a measurement error that is caused by a change in a center of gravity, it is desirable to form the load cell 900 to be bilaterally symmetrical. Due to the gap of the stepped cut portion 910, bending deflection of the load cell 900 that is caused by an external pressure exceeding a measurement range for the load cell 900 or repeated external pressure may be prevented. The external pressure exceeding the measurement range may be an excessive weight of the injection molded product 700 or the jig 600, or an amount of impact caused by other collisions.

An interval of gaps formed in the step portion of the stepped cut portion 910 may be designed to endure a load by a factor of three to five times of an appropriate weight capacity of the load cell 900. It is also desirable to form the interval not to be deformed, although a load greater than the appropriate load is applied. In a numerical example, when an injection molded product 700 weighing 1 to several kilograms is applied to the load cell 900, an actual bending degree of the load cell 900, for example, deformation from an original horizontal position that is caused by bending of both ends of the load cell 900, may be approximately 0.5 mm. Here, when a weight or an external force greater by a factor of three to five times of the weight of the injection molded product 700 is applied to the load cell 900, approximately 1 mm of bending deflection may occur in the load cell 900. Thus, when the gap is formed to be approximately 1 mm to prevent the bending deflection greater than 1 mm, a service life of the load cell 900 may be prolonged. Additional complex elements, for example, a pneumatic cylinder and a solenoid to prolong the service life of the load cell 900, by which the load of the injection molded product 700 may be applied to the load cell 900 only at a certain point and not be applied to the load cell 900 in other conveying routes, are needed. However, the implementation in this embodiment may become simpler because the additional complex elements are not necessary.

Figure 9:
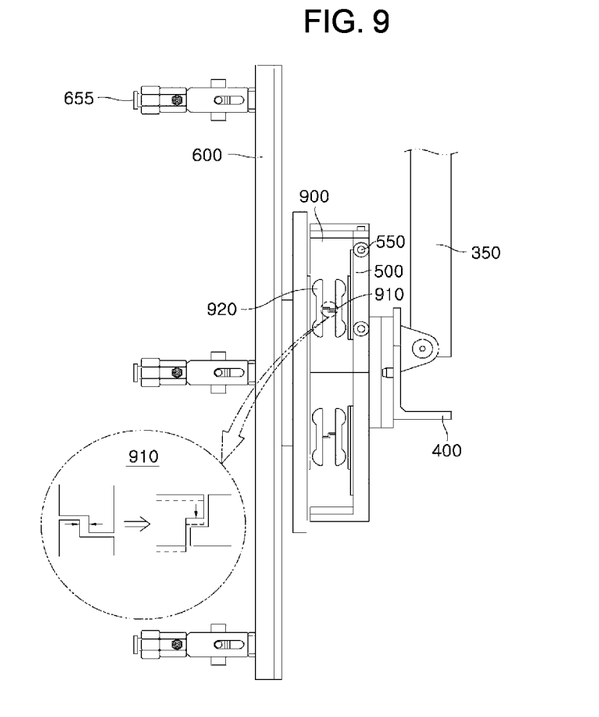
FIGS. 9 to 11 are cross-sectional views illustrating an embodiment in which a cut portion is formed in the load cell to protect the load cell provided according to the present invention.
Figure 11:
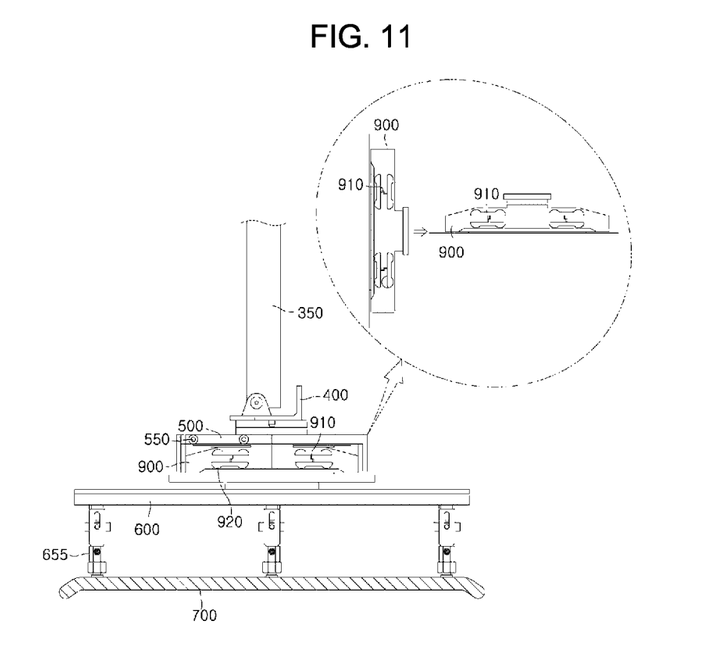

FIG. 11 illustrates a state in which the rotating unit 350 of FIG. 9 rotates at 90 degrees. Referring to FIG. 11, when the injection molded product 700 is attached to the adhesive element 655 and the load is applied to the load cell 900, both ends of the load cell 900 may be bent. Here, the gap of the stepped cut portion 910 may be pressed by the load and the gap may be narrowed and thus, an upper side of the stepped boundary surface 910 may be deformed as being hung on a step portion. Accordingly, the gap may perform as a buffer for the load cell 900.

However, the gap formed in the step portion of the stepped cut portion 910 may not sufficiently buffer an opposite-direction impact on the load cell 900. Thus, according to an embodiment of the present invention, a gap "d" may be formed between the support 500 and the load cell 900. As illustrated in another enlarged diagram of FIG. 9, the both ends and a center of the load cell 900 may be disposed adjacent to the support 500 and the gap "d" may be formed in a portion in which the load cell 900 is adjacent to the support 500. When the take-out robot collides with another object in a proceeding route, the gap "d" may perform as a buffer against deformation of the load cell 900. Although an interval of the gap "d" may be calculated in a same manner as in the interval of the gap formed in the step portion of the stepped boundary surface 910, the interval of the gap "d" may be set to be a more sufficient numeral by considering that intensity of an impact is greater than a general load.

Figure 10:
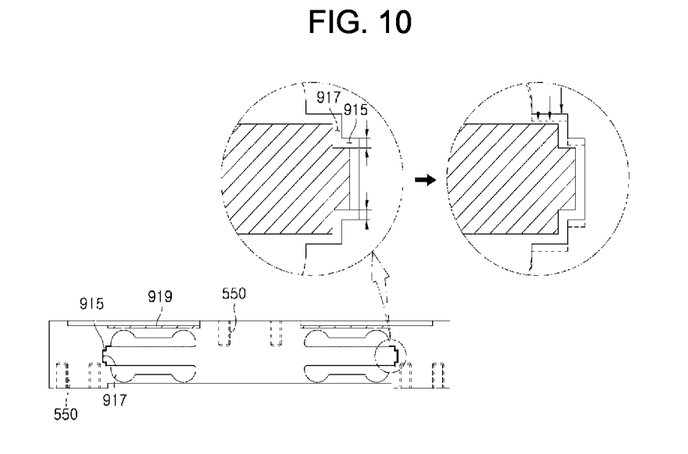

In addition, to overcome a limit that the gap structure performs as a buffer only for a direction of gravity, a modified cut surface may be provided as illustrated in FIG. 10. A gap to be formed in the both ends of the load cell 900 by a cut surface may be formed both to a horizontal and a vertical direction. A cross-sectional silhouette of the cut surface may be perpendicularly curved more than four times and thus, appearing as two connected "Z"s. The gap of FIG. 10 may include a horizontal portion 915 and a vertical portion 917. Thus, a gap of the horizontal portion 915 may perform as a buffer when the load to be applied to the load cell 900 is in a vertical direction, whereas a gap of the vertical portion 917 may perform as a buffer when a force to be applied to the load cell 900 is in a horizontal direction. Accordingly, the load cell 900 may be protected.

According to the embodiment of the present invention, the cut portion is formed to have the stepped boundary surface 910 in the load cell 900 and thus, the cut portion performs a function of a stopper against the bending deflection of the load cell 900 when the load is applied to the load cell 900. Accordingly, the load cell 900 may be protected without an additional chucking device used to measure a weight.

Such a structure of the load cell 900 to protect the load cell 900 may induce an error in repeatedly measuring a weight of a subsequent injection molded product 700 due to deformation of the load cell 900. Thus, "0" point adjustment may be required. After the injection molded product 700 is taken out, rotated to a horizontal direction to measure a weight of the injection molded product 700, conveyed to an applicable section, and dechucked, it may be desirable to reset a weight measuring scale 800 and take out a subsequent injection molded product 700. That is, a weight of a take-out jig 600 may be adjusted to be "0" to measure only an actual weight of the injection molded product 700.

A function of the resetting and the 0 point adjustment may be provided as a module in an automatic control system. In addition, it is desirable to select a 0 point adjustment position to be far away from an injection molder so as not to be affected by vibration of the injection molder. The position is also a point at which the weight is measured. After the weight of the injection molded product 700 is measured and the injection molded product 700 is conveyed to the point, the robot arm 350 returns to the point at which the weight of the injection molded product 700 is measured and reset the weight measuring system to be 0 point and thus, a cumulative error may be prevented when measuring a weight of a subsequent injection molded product 700 every conveyance cycle. In addition, a measurement error that is caused by a change in temperature may be prevented.

The module is configured to perform an operation of resetting to be 0 point when a value of the weight is transmitted from a load cell controller to a robot controller along with a stable or an unstable signal, and a stable value continues for a predetermined number of times. Such a configuration may remove an influence caused by instantaneous vibration.

It is desirable to select the point for measuring the weight of the injection molded product 700 to be a point least affected by the vibration of the injection molder and a point immediately before a desirable injection molded product 700 drops to a conveyer belt 1900.

In the weight measuring system to which the load cell 900 is applied, the load cell controller of the weight measuring system may include an error control module including a signal determining module to classify an unstable signal exceeding a predetermined amplitude in association with a weight transmitted from the load cell 900 and a stable signal within the amplitude in order to control a measurement error caused by the vibration of the injection molder and/or external vibration when measuring the weight. Accordingly, the unstable signal exceeding the predetermined amplitude in association with the weight transmitted from the load cell 900 may be disregarded and a standby state may be taken. In addition, a measurement value may be taken only in the case of the stable signal within the amplitude.

A size and a form of the load cell 900 may be modified based on a weight of an injection molded product 700. For example, when the weight of the injection molded product 700 increases, a thickness of a bending occurrence unit to which the strain gauge 919 of the load cell 900 is attached may be designed to be thicker.

When the number of cavities formed in the injection molder is two or more, respective weights of two or more injection molded products 700 that are absorbed from the cavities may be measured. To measure a weight of each injection molded product 700, the weight measuring system of the load cell 900 may include an individual gauge at each position.

As described herein, it is possible to realize the take-out robot which measures a weight of an injection molded product 700, determines whether the injection molded product 700 is desirable or faulty, and differently sets a conveying route for a desirable and a faulty product based on a result of the determination.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

INDUSTRIAL APPLICABILITY

The present invention may be applied to an operation of molding a material using a mold, extrusion molding, or injection molding, and taking out and conveying the molded material.

The invention claimed is:

1. A take-out robot chucking and conveying an injection molded product, comprising:
   a load cell provided in a rotating unit of a robot arm of the take-out robot to measure a weight of the injection molded product on a conveying route, and determining whether the injection molded product is desirable or faulty, and setting the conveying route of the product for a desirable or a faulty product.

2. The take-out robot of claim 1, wherein the robot arm further comprises:
   a jig comprising at least one adhesive element that is fixed to the rotating unit using a fixing element and allows the injection molded product to be attached thereto;
   a first fixing element that connects the rotating unit and the load cell mounted between the rotating unit and the jig;
   a second fixing element that connects the load cell and the jig; and
   a chucking element that is installed by connecting the rotating unit and the jig comprising the adhesive element used to allow the injection molded product to be attached thereto,
   wherein the rotating unit is fixed to an end of the robot arm to be rotatable, rotates to allow the injection molded product and the jig to be horizontally disposed after the injection molded product is attached, and rotates to allow the injection molded product to face downwards,
   wherein the chucking element performs chucking to allow the jig to be held onto the rotating unit, cancels the chucking to allow the weight of the injection molded product to be measured during conveyance of the injection molded product, and allows a load of the jig and the injection molded product to be applied to the load cell to apply, as a tensile force, a difference in tension applied to the first fixing element and the second fixing element fixed to the load cell so as to enable the measurement of the weight.

3. The take-out robot of claim 2, wherein the chucking element comprises any one of a solenoid, a pneumatic cylinder, and a rotatable hand device.

4. The take-out robot of claim 1, wherein the robot arm comprises:
   a jig comprising at least one adhesive element fixed to the rotating unit using a fixing element and allows the injection molded product to be attached thereto; and
   the load cell provided between the rotating unit and the jig,
   wherein the rotating unit is fixed to an end of the robot arm to be rotatable, and rotates to place the injection molded product in a horizontal position after the injection molded product is attached so as to allow the load cell to measure the weight of the injection molded product,
wherein the load cell comprises at least one cut portion,
wherein the cut portion forms a stepped boundary surface,
wherein a step portion of the stepped boundary surface forms a gap in a direction vertical to gravity when the rotating unit is at a rotated position to measure the weight of the injection molded product, and
wherein the gap prevents bending deflection of the load cell when the weight of the injection molded product is applied to the load cell.

5. The take-out robot of claim 4, wherein a cut surface of the cut portion is formed both in a horizontal direction and a vertical direction,
wherein the gap performs a function of preventing the bending deflection of the load cell against a horizontal force and a vertical force applied to the load cell to prevent damage to the load cell.

6. The take-out robot of claim 4, wherein a support to which the load cell is fixed is installed adjacent to the rotating unit,
wherein the support is disposed with a gap from the load cell, and
wherein, when the load cell is applied with a force toward the support, the applied force is buffered in the gap.

7. The take-out robot of claim 4, wherein, after the load cell measures the weight of the injection molded product and the injection molded product is conveyed to a corresponding point, the robot arm returns to a point at which the weight of the injection molded product is measured and allows the load cell to reset a weight measuring system to be "0" point in order to prevent a cumulative error in measuring a weight of a subsequent injection molded product every cycle of conveying the injection molded product and to prevent a measurement error caused by a change in temperature.

8. The take-out robot of claim 2, wherein a point at which the weight of the injection molded product is measured is determined to be a point least affected by vibration of an injection molder, and to be a point immediately prior to a drop of the desirable product to a conveyer belt.

9. The take-out robot of claim 8, wherein, in order to control a measurement error affected by the vibration of the injection molder or external vibration during weight measurement, a load cell controller of the weight measuring system comprises an error control module to disregard an unstable signal and select a standby mode when a signal in association with the weight to be transmitted from the load cell is the unstable signal exceeding a predetermined amplitude, and to obtain a measured value only when the signal is a stable signal within the predetermined amplitude.

10. The take-out robot of claim 4, wherein the load cell is applied by changing a size and a form thereof based on the weight of the injection molded product.

11. The take-out robot of claim 3, wherein a point at which the weight of the injection molded product is measured is determined to be a point least affected by vibration of an injection molder, and to be a point immediately prior to a drop of the desirable product to a conveyer belt.

12. The take-out robot of claim 11, wherein, in order to control a measurement error affected by the vibration of the injection molder or external vibration during weight measurement, a load cell controller of the weight measuring system comprises an error control module to disregard an unstable signal and select a standby mode when a signal in association with the weight to be transmitted from the load cell is the unstable signal exceeding a predetermined amplitude, and to obtain a measured value only when the signal is a stable signal within the predetermined amplitude.

* * * * *